Nov. 5, 1929.　　　F. B. MANY　　　1,734,263
HELICOPTER
Filed Nov. 23, 1925
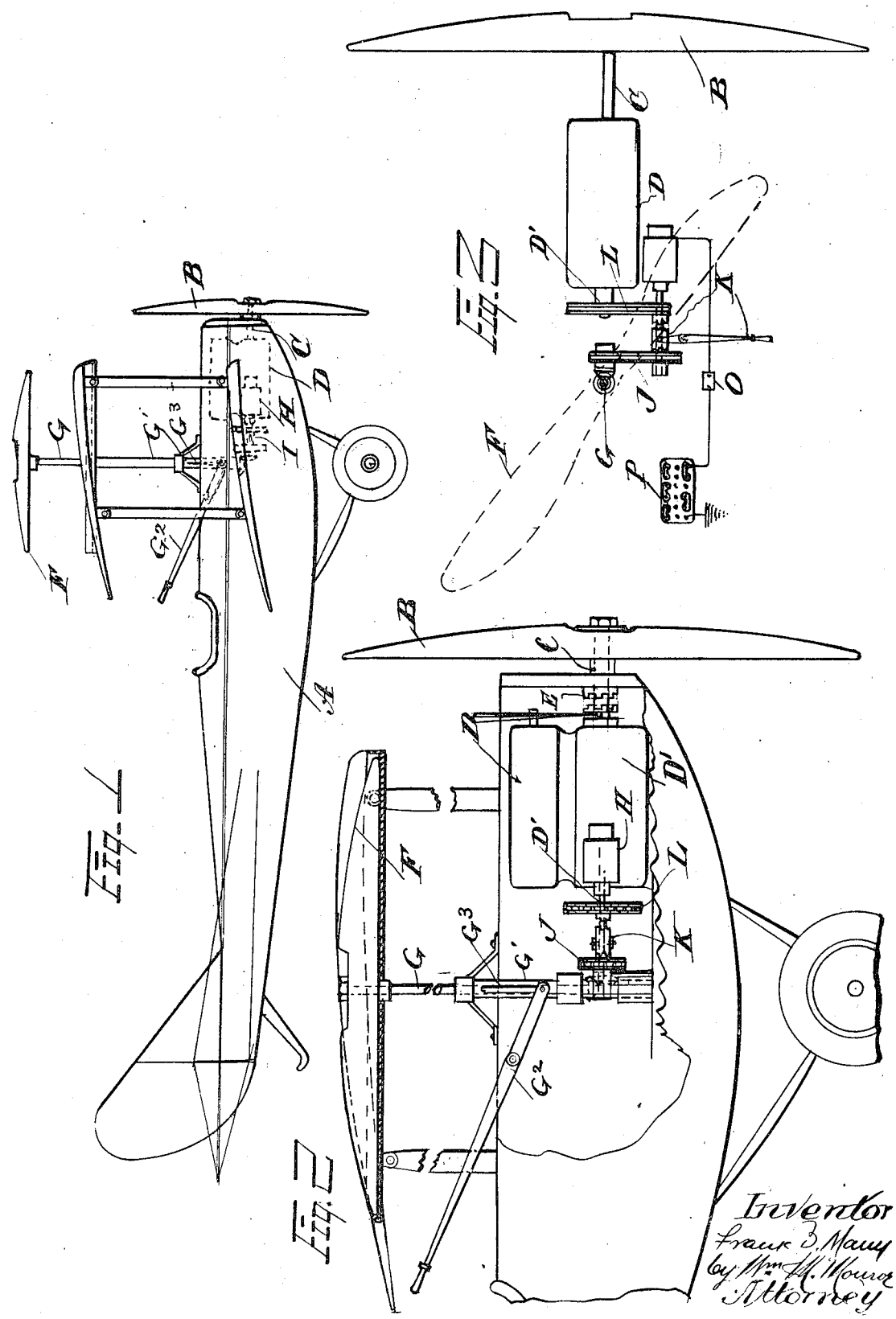

Patented Nov. 5, 1929

1,734,263

UNITED STATES PATENT OFFICE

FRANK B. MANY, OF CLEVELAND, OHIO

HELICOPTER

Application filed November 23, 1925. Serial No. 70,957.

The objects of the invention are to provide a helicopter attachment for a heavier than air airship, by means of which the ascent and descent of the ship can be confined to the landing position and the long glide of the ship heretofore required to permit of a gradual descent, and the great length of suitable landing field therefor may be avoided, and it will be possible to descend upon a platform of limited area, as upon the roof of a building, and to ascend therefrom without danger of collision with other buildings.

To accomplish this result the helicopter is provided with a separate motor so that it may be operated at any time independently of the motor or explosion engine which drive the main propeller.

Also this separate motor is employed as a starter for the main motor, and is also wound to be reversed and used as a motor generator, and is connected with a storage battery in the fuselage of the air ship, and it may be alternately connected with the helicopter, or with the main motor to function, either as a temporary motor to drive the helicopter, or as a starter for the main motor, since the period of operation of the helicopter will be limited to ascending and descending, and the time allowed for starting the main motor need not be further prolonged but may be controllable at will by the operator.

Also as a generator it may be employed to recharge the batteries while the gasoline motor is in use. It is essential that a helicopter propeller should have a separately operable operating device to permit it to be used independently of the main motor propeller, and by means of a suitable organization and adaptation of a connecting or clutch mechanism, the same motor can be employed as a starting device for the gasoline motor that drives the main propeller.

The invention further includes a controller for the rate of speed of operation of the motor generator, permitting it to start at a low rate of speed and thereafter to build up its speed to any amount of velocity required.

It includes clutch mechanism for cutting out the shaft of the helicopter propeller from the starting motor when the desired altitude has been attained and connecting the same operatively with the shaft of the engine of the main propeller, to crank the same and thereafter for cutting out the starting motor altogether, to enable the gasoline motor to propel the air ship.

It also includes means, when the airship is about to descend, for stopping the main propelling engine and for connecting the starting engine with the helicopter shaft until a suitable landing has been made.

It also includes mechanism for connecting the gasoline engine with the motor generator in such a manner, that the motor generator will operate to recharge the storage batteries while the airship is in flight, and thus place the battery in condition to operate the helicopter, so that a suitable landing can be made. It includes driving shafts for the gasoline engine and the motor generator and for the main propeller and helicopter, and geared connections between said motor generator and said main and helicopter shafts and clutch mechanism therefor permitting of alternate connection therewith and disconnection therefrom.

The invention further includes the combination of parts hereinafter described, illustrated in the accompanying drawings and specifically pointed out in the claims.

In the accompanying drawings Fig. 1 is a side elevation of the device; Fig. 2 is an enlarged longitudinal section thereof; Fig. 3 is a plan thereof showing the arrangement of clutch mechanism.

In these views A represents the body or fuselage; B represents the main propeller; C represents the driving shaft therefor; D is the gasoline engine; E the clutch operatively connecting the engine shaft D' with the main propeller shaft; F is the helicopter propeller having horizontally disposed wings and mounted upon a vertical shaft G; H is the motor generator, the shaft of which, I, is operatively connected with the shaft of the helicopter by means of chain gearing J and a clutch K. This motor generator is also connected operatively with the shaft D' of the gasoline engine by means of gearing L and the clutch K.

By means of the gearing specified and the clutch connections enumerated, the motor generator may be connected, first, with the helicopter to enable the air ship to rise, and subsequently, when an ascent has been made to a suitable height to enable the airship to glide or proceed without danger of collision with buildings or trees, or other elevations, they enable the motor generator to be disconnected from the helicopter and operatively connected with the main gasoline engine and to serve as a starter therefor until ignition takes place and the engine can operate efficiently.

This elevation should be sufficient to permit the air ship to glide for a short distance if the starter is operated for some time before ignition takes place, and the engine is successfully operating.

The motor generator may be constructed in accordance with the well known construction of the electric starter for automobiles of which there are several types and will not require further description in connection with this air ship, and when it is operated as a generator will serve to recharge the storage battery P and place it in condition to operate the same device as a motor for the helicopter, or as a starter for the main gasoline engine. The helicopter propeller is normally sunk in a recess in the upper plane and can be raised for use or lowered so as not to interfere with the stream lines of the plane by means of a lever $G^2$ operating upon an extension shaft G through a slot $G^3$ in a vertical sleeve $G^5$.

Having described the invention what I claim as new and desire to secure by Letters Patent is:

1. In an air ship a main propeller and gasoline engine therefor, and a helicopter propeller and a motor generator therefor, said motor being operatively connectible with the shafts of both of said propellers and serving alternately as a starter for said gasoline engine and as a direct motor for said helicopter.

2. In an air ship, a main propeller and a gasoline engine therefor, and a helicopter propeller, a motor-generator, and a battery electrically connected therewith, and clutch mechanism for alternately connecting said motor generator with the shafts of said gasoline motor to serve as a starter therefor and with the shaft of said helicopter propeller as a direct motor therefor, said generator motor serving also as a generator when connected with the shaft of said gasoline engine to charge said battery.

3. In an air ship a main propeller and gasoline engine therefor, a helicopter propeller and an electric motor therefor, said motor being operatively connectible with the shafts of both of said propellers to serve alternately as a starter for one and a direct motor for the other, and means for alternately connecting said electric motor with said shafts.

4. In an air ship, a main propeller and a gasoline engine therefor, and a helicopter propeller, a motor-generator, and a battery electrically connected therewith, and clutch mechanism for alternately connecting said motor generator with the shafts of said gasoline motor to serve as a starter therefor, and with the shaft of said helicopter propeller as a direct motor therefor, said generator motor serving also as a generator when connected with the shaft of said gasoline engine to charge said battery and clutch mechanism for alternately connecting said motor generator with the shafts of said engine and helicopter propeller.

In testimony whereof, I hereunto set my hand this 25th day of September, 1925.

FRANK B. MANY.